UNITED STATES PATENT OFFICE.

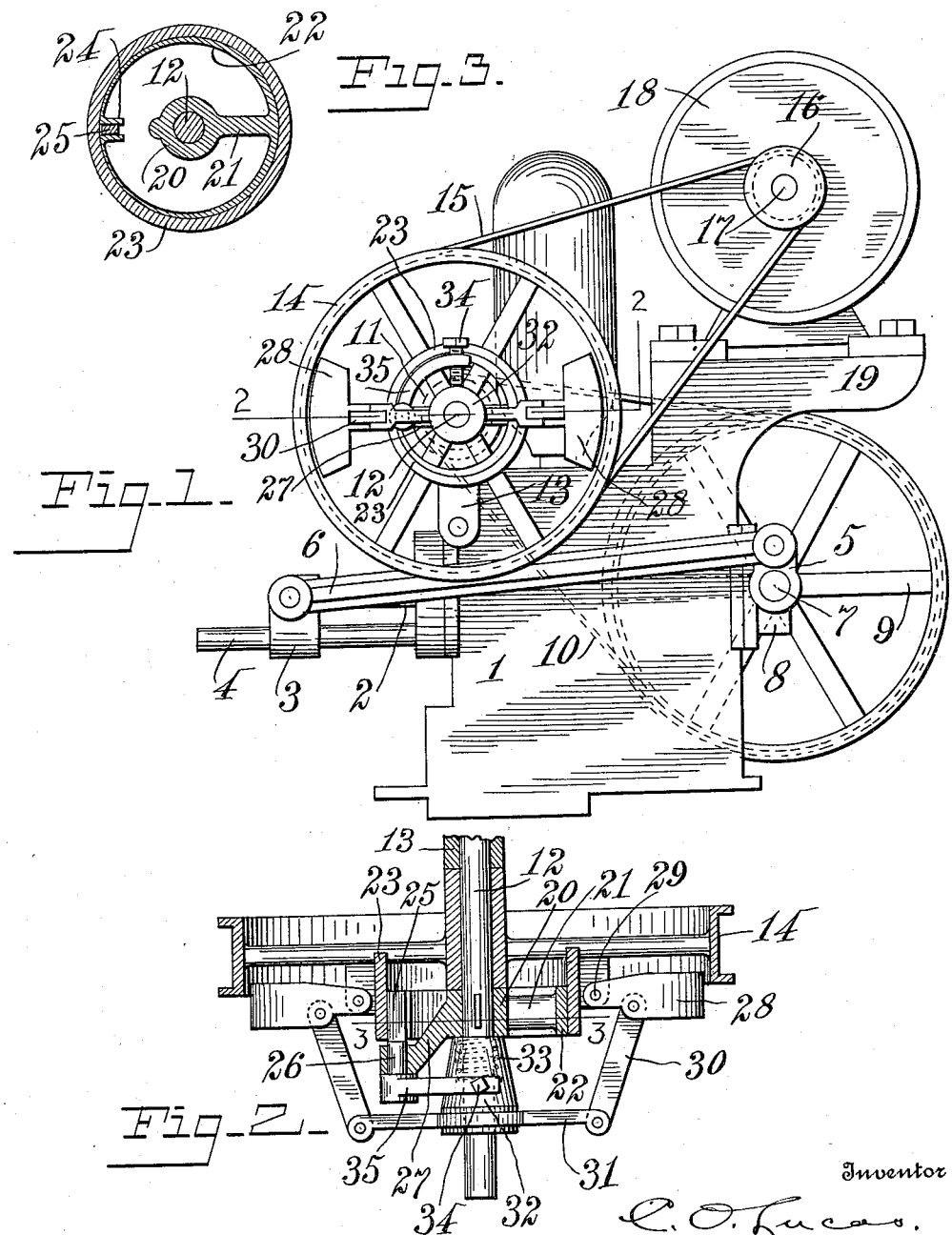

CHARLES O. LUCAS, OF DAYTON, OHIO.

DRIVING CONNECTING MEANS.

1,169,844.  Specification of Letters Patent.  Patented Feb. 1, 1916.

Application filed August 27, 1914. Serial No. 858,891.

*To all whom it may concern:*

Be it known that I, CHARLES O. LUCAS, a citizen of the United States, residing at Dayton, in the county of Montgomery and State of Ohio, have invented certain new and useful Improvements in Driving Connecting Means; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in driving connecting means between electric motors and driven members such as pumps, washing machines, etc. As is well known, the current when taken from the mains is subject to considerable fluctuation and often is very feeble. When a motor is pulling a load and the current should become weak, the motor will stall and as a consequence will burn out.

The object of the invention is, therefore, to provide means for obviating such occurrences as will be hereinafter described and claimed.

To the foregoing ends the invention consists of a pulley and specific clutch devices controlled thereby constructed and arranged so that the pulley will cause the specific clutch devices to connect said pulley with its shaft when said pulley attains the requisite speed.

Referring to the accompanying drawings, Figure 1 represents a pump driven by an electric motor through my improved means; Fig. 2 is a section on the line 2—2 of Fig. 1; and Fig. 3 is a section on the line 3—3 of Fig. 2.

In a more particular description of my invention, similar reference characters indicate the same parts in the drawings and description.

Referring more particularly to the drawings, 1 represents a driven member which, in the present instance, constitutes a pump. It will be understood, however, that such member may consist of any other machine capable of being actuated by an electric motor. The pump 1 is provided with a piston 2 extending from a cross-head 3 which is slidably mounted on a guide-rod 4. The cross-head 3 is connected with a crank 5 by a rod 6. The crank 5 is mounted on a shaft 7 journaled in the end 8 of the pump and is provided with a pulley 9. Passing around the pulley 9 is a belt 10 which also passes around a smaller pulley 11 on a shaft 12 journaled in a bearing 13. Freely mounted on the shaft 12 is a pulley 14 around which passes a belt 15. Said belt 15 also passes around a pulley 16 on the shaft 17 of an electric motor 18. The motor 18 is mounted on a shelf 19 extending from the pump 1. To permit the armature of the motor 18 to rotate without actuating the driven member when the motor receives a feeble current, a centrifugally actuated clutch member is provided as follows: Rigidly secured to the shaft 12 is a hub 20 provided with an arm 21 which supports a resilient band 22. The band 22 is adapted to be placed in frictional engagement with a drum 23 mounted on the pulley 14. The said band 22 is further provided with shoes 24 which are in engagement with the flattened end 25 of a shaft 26, journaled in a bearing 27 extending from the hub 20 keyed to the shaft 12. When the shaft 26 is rocked, the band 22 is expanded against the drum 23 thereby rigidly connecting the pulley 14 and the shaft 12 thus permitting the motor to drive the pump. The shaft 26 is rocked by means of fly-balls 28 pivoted at 29 to the pulley 14. The said fly-balls 28 are connected by means of links 30 with a yoke 31 extending from a cone 32 slidably mounted on the shaft 12. The cone 32 is normally pressed outwardly by a spring 33 and when moved inwardly by the fly-balls 28 engages an adjusting screw 34 extending from an arm 35 secured to the shaft 26 or part thereof. When the motor is at rest or is running at low speed under a feeble current, the cone 32 moves away from the pulley 14 under the action of the spring 33 which causes a releasing of the band 22 from frictional engagement with the drum 23. When the motor is initially started or is rotated at a low speed, the pulley 14 and the fly-balls 28 carried thereby will be initially rotated without actuating the driven member but, when the centrifugal force becomes sufficient to move the fly-balls 28 to the positions shown in the drawings, the band 22 will be expanded against the drum 23 thereby connecting the motor 18 and the driven member 1. It has been found that by thus constructing a driving connecting means which permits the motor to rotate when the driven member is under load and the current is feeble, the motor will not burn out. In other words, the motor is permitted to get up to speed under full voltage before it actuates the driven member. The driven member is started gradually owing to the frictional engagement between the resilient band 22 and the drum 23. Should the current from the source of power be shut off at any time, especially when the machine is doing work, and the current from the source be turned on again while the machine is in position to do work, the feeble current at first will be only sufficient to move the motor and the loose pulley. This action will be kept up until the current is strong enough to move the pulley to speed. The clutch at such time will engage. If the current is not strong enough to operate the load, the motor will stop and the clutch become disengaged. The starting and stopping of the motor will be repeated until the current is strong enough to carry the load. By allowing the motor to operate on a weak current, as may be caused by stoppage of the current from the source of power or occasional feeble current on distant lines, the motor is prevented from burning out.

Having described my invention, I claim—

The combination of a pulley, a drum mounted thereon, a shaft upon which said pulley is freely mounted, a friction band mounted on said shaft and adapted to engage the inner surface of said drum, a cone slidably mounted on said shaft, a spring mounted within said cone and normally maintaining it in an outward position, weights pivoted at opposite points of said drum and adapted to be actuated by said pulley when it attains a given speed, a yoke engaging said cone, links connecting said yoke to said weights, a shaft projected between the adjacent ends of said friction band, an arm upon which said shaft is supported, and means on said arm engaging said cone whereby said shaft is actuated to expand the friction band when the speed of the pulley is sufficient to control said cone, substantially as specified.

In testimony whereof I affix my signature, in presence of two witnesses.

CHAS. O. LUCAS.

Witnesses:
R. J. McCarty,
Matthew Siebler.

Copies of this patent may be obtained for five cents each, by addressing the "Commissioner of Patents, Washington, D. C."